United States Patent
Dettling et al.

(10) Patent No.: US 11,877,542 B2
(45) Date of Patent: Jan. 23, 2024

(54) BACKPACK BLOWER

(71) Applicant: Andreas Stihl AG & Co. KG, Waiblingen (DE)

(72) Inventors: Andreas Dettling, Stuttgart (DE); Dennis Karl, Freiberg a.N. (DE); Denis Ehrler, Wernau (DE); Sebastian Friedrich, Korb (DE); Simon Klingler, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 97 days.

(21) Appl. No.: 17/464,210

(22) Filed: Sep. 1, 2021

(65) Prior Publication Data

US 2022/0061235 A1 Mar. 3, 2022

(30) Foreign Application Priority Data

Sep. 2, 2020 (EP) .................................... 20194005

(51) Int. Cl.
*A01G 20/47* (2018.01)
*H01M 50/247* (2021.01)
(Continued)

(52) U.S. Cl.
CPC ........... *A01G 20/47* (2018.02); *F04D 19/002* (2013.01); *F04D 25/06* (2013.01); *H01M 50/247* (2021.01); *A47L 5/14* (2013.01); *H01M 2220/30* (2013.01)

(58) Field of Classification Search
CPC ....... A01G 20/47; F04D 19/002; F04D 25/06; F04D 17/16; F04D 25/08; F04D 29/441;
(Continued)

(56) References Cited

U.S. PATENT DOCUMENTS 9,167,751 B2  10/2015  Thackery et al.
2016/0208449 A1  7/2016  Barth et al.
(Continued)

FOREIGN PATENT DOCUMENTS

EP   2 684 446 A2   1/2014
EP   3 225 098 A1   10/2017
(Continued)

OTHER PUBLICATIONS

German-language European Search Report issued in European Application No. 20194005.3 dated Feb. 24, 2021 with partial English translation (nine (9) pages).

*Primary Examiner* — Aaron R Eastman
(74) *Attorney, Agent, or Firm* — Crowell & Moring LLP

(57) ABSTRACT

A backpack blower has a backpack with a load-bearing frame, a blower tube with a backpack-side tube section which is held on a rear side of the load-bearing frame, and a hand-side tube section which extends past a first side region of the load-bearing frame, a drive motor, an energy source for the drive motor, and an axial fan which is driven by the drive motor, has an axial fan axis, and is arranged in the backpack-side tube section of the blower tube. The backpack-side tube section of the blower tube runs with a main direction component in a backpack transverse direction of the load-bearing frame and has an axial blower tube end termination which projects laterally beyond a second side region of the load-bearing frame, which second side region faces away from the first side region, and/or is surrounded at least on a part of its circumference by a protective ring element which is connected to the load-bearing frame. The blower may be an electric leaf blower.

21 Claims, 5 Drawing Sheets

(51) Int. Cl.
*F04D 19/00* (2006.01)
*F04D 25/06* (2006.01)
*A47L 5/14* (2006.01)

(58) Field of Classification Search
CPC .... F04D 29/462; F04D 29/626; F04D 29/703; H01M 50/247; H01M 2220/30; A47L 5/14; E01H 2001/0881; E01H 1/0809; Y02E 60/10
See application file for complete search history.

(56) References Cited

U.S. PATENT DOCUMENTS

| | | | |
|---|---|---|---|
| 2019/0045725 A1* | 2/2019 | Shangguan | A01G 20/40 |
| 2020/0154962 A1 | 5/2020 | Fie et al. | |
| 2020/0221651 A1* | 7/2020 | Klingler | A01G 20/47 |
| 2021/0227758 A1 | 7/2021 | Bylund et al. | |
| 2023/0032953 A1* | 2/2023 | Jarmesta | A47L 9/2884 |

FOREIGN PATENT DOCUMENTS

| | | |
|---|---|---|
| EP | 3 420 807 A1 | 1/2019 |
| EP | 3 682 730 A1 | 7/2020 |
| WO | WO 2019/206581 A1 | 10/2019 |

* cited by examiner

BACKPACK BLOWER

CROSS REFERENCE TO RELATED APPLICATION

This application claims priority under 35 U.S.C. § 119 from European Patent Application No. 20194005.3, filed Sep. 2, 2020, the entire disclosure of which is herein expressly incorporated by reference.

BACKGROUND AND SUMMARY OF THE INVENTION

The invention relates to a backpack blower which comprises a backpack having a load-bearing frame, a blower tube with a backpack-side tube section which is held on a rear side of the load-bearing frame, and having a hand-side tube section which extends past a first side region of the load-bearing frame, a drive motor, an energy source for the drive motor, and an axial fan which is driven by the drive motor, has an axial fan axis, and is arranged in the backpack-side tube section of the blower tube.

A blower of this type is carried during operation by a user on his/her back. To this end, the backpack usually has carrying or shoulder straps which are fastened to the load-bearing frame and by way of which the user can shoulder the backpack with the load-bearing frame in the manner of a rucksack and can thus carry it on his/her back. In the present case, a backpack-side tube section and a hand-side tube section are to be understood to mean a tube section which is assigned to the load-bearing frame, that is to say is situated in the vicinity of it, and a tube section which is situated on the side of a user's hand. In use, as a consequence, the user can grip or operate the blower tube on the hand-side tube section by way of one or both hands. The essential further components of the blower are situated on the load-bearing frame, in particular the backpack-side tube section with the axial fan, the drive motor which drives the axial fan, and the energy source for the drive motor.

Blowers of this type and similar types in use are blowing-out blowers, in particular called leaf blowers, usually also leaf blower units, and vacuum blowers, for example as backpack vacuums. In the case of the blowing-out blowers, the backpack-side tube section forms an air inlet-side tube section, that is to say a section of the blower tube, in which the inlet for a blowing medium which is conducted in the blower tube is situated, whereas the hand-side tube section forms an air outlet-side tube section, that is to say a section of the blower tube, in which the outlet for the blowing medium is situated. In the case of the vacuum blowers, conversely, the hand-side tube section forms the air inlet-side tube section, whereas the backpack-side tube section forms the air outlet-side tube section. For easier comprehension, terminologies for the blowing-out type of blowers are referred to in the present case. These terminologies can be understood in a correspondingly modified manner for the vacuum type of blowers, that is to say the air inlet side is then the air outlet side, an air inlet duct is an air outlet duct, etc. The blowing medium is usually air, but in specific cases can also be another blowing medium; in the present case, for the sake of simplicity, the terminologies which make reference to the blowing medium of air, such as air inlet-side, air outlet-side, air inlet duct, etc., are to be understood for the designation of corresponding blower components in a general sense which also comprises these other cases, in which the blowing medium is not air.

For blowers of this type, embodiments with an internal combustion engine as fan drive motor and a petrol tank as associated energy source and embodiments with an electric motor as fan drive motor and a rechargeable battery pack as associated energy source are alternatively customary; in the present case, the term of rechargeable battery pack is to be understood in a general sense for the designation of any desired conventional type of electric battery.

If orientation terms such as upper side, lower side, front side, rear side, vertical direction and horizontal direction, etc. are used in the present case for the blower and, more specifically, for the backpack or the load-bearing frame, they relate to the blower in its carrying position on the back of a user. The upper side is then the side which lies vertically at the top, the lower side is the side which lies vertically at the bottom, longitudinal sides of the blower or the backpack run on the sides on the left and on the right in a substantially vertical direction, transverse sides of the blower or the backpack run substantially horizontally transversely upwards and downwards, the front side is the side which faces the carrying user, the rear side is that side of the blower or the backpack which faces away from the carrying user, and the direction from the front side to the rear side or from the rear side to the front side is called the front-to-rear direction.

A blower of the type mentioned at the outset is disclosed in laid-open publication EP 3 225 098 A1 in an embodiment as a blowing-out electric blower. An electric motor and the axial fan are integrated with a common axial motor/fan axis into a common fan body which is arranged in the backpack-side tube section with an axial fan axis which is parallel to the longitudinal direction of the said tube section, two blower tubes preferably being provided which extend with their hand-side tube sections past a left-hand and right-hand side region of the load-bearing frame for two-handed operation by way of the user. The respective backpack-side tube section is arranged on the load-bearing frame in such a way that its longitudinal axis and therefore the fan axis of the installed axial fan extends parallel to a rear side surface of the backpack or the load-bearing frame. As an alternative to an arrangement of the backpack-side tube sections substantially vertically on the left-hand and right-hand side of the load-bearing frame or the backpack next to a rechargeable battery pack which is held on the rear side of the load-bearing frame, positioning of the respective backpack-side tube section on the rear side of the load-bearing frame below the rechargeable battery pack with a horizontal course or a course of the fan axis which is oblique with respect to the horizontal and vertical is proposed. Here, the respective backpack-side tube section extends from a side region of the load-bearing frame, past which the said backpack-side tube section extends, along the rear side of the load-bearing frame in the direction of the opposite side region and ends at a spacing from the latter with an end region which tapers conically towards an axial blower tube end termination as air inlet.

Laid-open publication EP 2 684 446 A2 discloses a backpack leaf blower with a radial fan which, together with an associated drive motor, is held on a load-bearing frame of a backpack in such a way that a common drive axis of the motor and the radial fan runs with a vertical main direction component at an acute angle of between approximately 5° and approximately 35° with respect to a load-bearing frame plane, in which the load-bearing frame lies substantially, the drive axis intersecting the load-bearing frame plane at a point which lies close to an upper side of the load-bearing frame.

Laid-open publication US 2016/0208449 A1 discloses a backpack electric blower, in the case of which a rechargeable battery pack is held on a load-bearing frame of a backpack, whereas an axial fan and an associated electric drive motor are arranged in a hand-held blower tube which is connected via a flexible supporting connection and an electric cable to the backpack rechargeable battery pack.

Laid-open publication EP 3 682 730 A1 discloses a fan unit for a portable, hand-held blower with a tubular housing section, in which an axial fan is received in addition to an associated drive motor, an air guiding plate being arranged in front of an intake opening at an axial spacing, the external dimensions of which air guiding plate are greater than the external dimensions of the intake opening. An annular intake gap which is provided with an air inlet grille or protective grille is configured between the air guiding plate and an outer edge of the housing section, from which intake gap an air feed duct leads further which is delimited radially to the outside by a tube wall of the housing section and radially to the inside by an air guiding cone which adjoins the air guiding plate towards the intake opening.

As technical problem, the invention is based on the provision of a backpack blower of the type mentioned at the outset, which backpack blower provides advantages in comparison with the abovementioned prior art, in particular with regard to the arrangement of the backpack-side tube section of the blower tube on the load-bearing frame and/or with regard to the blowing medium conducting.

The invention solves this problem by providing a backpack blower which comprises a backpack, a blower tube, a drive motor, an energy source for the drive motor, and an axial fan which is driven by the drive motor. The backpack comprises a load-bearing frame. The blower tube comprises a backpack-side tube section which is held on a rear side of the load-bearing frame and a hand-side tube section which extends past a first side region of the load-bearing frame. The axial fan has an axial fan axis and is arranged in the backpack-side tube section of the blower tube. The backpack-side tube section of the blower tube runs with a main direction component in a backpack transverse direction of the load-bearing frame, and has an axial blower tube end termination. Here, the backpack transverse direction is understood to mean that direction which is perpendicular with respect to the front-to-rear direction and, in the use position of the blower, runs horizontally or substantially horizontally on the back of a user.

According to one aspect of the invention, the axial blower tube end termination projects laterally beyond a second side region of the load-bearing frame, which second side region faces away from the first side region of the load-bearing frame.

According to another aspect of the invention, which can be present alternatively or in addition to the first-mentioned aspect, the axial blower tube end termination is surrounded at least on a part of its circumference by a protective ring element which is connected to the load-bearing frame.

Advantageous developments of the invention which contribute to the solution of this and further problems are specified in the dependent claims, the full scope of the contents of which are hereby made the contents of the description by way of reference.

In the case of this configuration of the blower, as a consequence, the backpack-side tube section of the blower tube extends with its longitudinal direction parallel to the backpack transverse direction of the load-bearing frame or at least predominantly in the said backpack transverse direction of the load-bearing frame, that is to say with a greater direction component in this direction than in a direction which is perpendicular with respect to it, which is a favorable precondition for a compact arrangement of the said backpack-side blower tube section on the load-bearing frame of the backpack.

By, in the case of the corresponding invention aspect, the backpack-side tube section projecting with its axial end termination laterally, that is to say transversely or in the lateral direction, beyond the facing side region of the load-bearing frame, that is to say its left-hand or right-hand side region, the backpack-side tube section can be arranged, if required, in a very compact and space-saving manner on the load-bearing frame, even if it has a conical widened portion in the radially outwardly pointing direction, for example in the form of an air inlet funnel, in the said axial end region. In particular, the backpack-side tube section does not necessarily have to be positioned with the full cross section or diameter of its conically widened end termination behind the load-bearing frame and/or behind other blower components which are held on the load-bearing frame. Rather, the said optionally conically widened end termination can be arranged in the depth direction of the backpack, that is to say in the front-to-rear direction, so as to overlap with the load-bearing frame and/or other blower components which are held on it.

By, in the case of the corresponding invention aspect, the axial blower tube end termination of the backpack-side tube section being surrounded by the protective ring element which is connected to the load-bearing frame, to be precise at least along a part of the overall circumference of the blower tube end termination, the blower tube end termination can be protected against damaging influences from the outside by way of the protective ring element which surrounds it at least partially. In particular, the protective ring element can provide an impact or drop protection means for the said blower tube end termination against impacts which can act from the outside, for example if the load-bearing frame or the backpack accidentally falls on the ground or is placed on the ground by the user or the user accidentally strikes a fixed obstacle with the blower which is carried by him/her on his/her back.

In a development of the invention, the fan axis encloses a horizontal angle between 1° and 30° with a vertical backpack transverse plane of the load-bearing frame. Here, the vertical backpack transverse plane is to be understood to mean that vertical plane perpendicular with respect to the front-to-rear direction of the backpack or the load-bearing frame, in which the load-bearing frame predominantly lies. In this case, as a consequence, the fan axis and therefore normally also the backpack-side tube section of the blower tube run with their longitudinal direction in the horizontal plane correspondingly obliquely with respect to the vertical backpack transverse plane of the load-bearing frame and therefore with respect to its backpack transverse direction which lies in the horizontal plane. This can contribute to optimized positioning of the backpack-side blower tube section and to optimized blowing medium conducting in the backpack-side blower tube section. In addition, as a result of this oblique positioning of the fan axis in relation to the load-bearing frame, the protective ring element can project correspondingly with its side which faces the load-bearing frame on the associated load-bearing frame side and, in a case in which the backpack strikes an underlying surface with this side, that is to say its left-hand or right-hand hand side, in front, can provide more comprehensive impact protection, by absorbing impact forces which occur specifically by way of the said projecting section and forwarding them to the load-bearing frame. In alternative embodiments, the fan axis runs parallel to the backpack transverse direction of the load-bearing frame or encloses only a small angle of less than 1° with the latter, or the backpack-side blower tube section is arranged with more pronounced oblique positioning on the load-bearing frame, with the result that the fan axis encloses a horizontal angle of more than 30° with the backpack transverse direction of the load-bearing frame.

In a refinement of the invention, the horizontal angle lies specifically in the range between 2° and 15° or more specifically between 2° and 3°. An oblique position, defined as a result, of the fan axis and therefore also of the backpack-side blower tube section with respect to the backpack transverse direction of the load-bearing frame can be particularly favourable for certain blower embodiments, in particular once again with regard to optimized positioning and/or optimized impact and/or drop protection.

In a development of the invention, the fan axis encloses a vertical angle of at most 45° with a horizontal backpack plane of the load-bearing frame. Here, the horizontal backpack plane is to be understood to mean the plane which is defined by the front-to-rear direction and the backpack transverse direction of the load-bearing frame. In this case, the fan axis and therefore as a rule also the backpack-side blower tube section run horizontally or obliquely upwards or downwards by at most 45° with respect to the horizontal. This positional orientation of the fan axis and of the backpack-side blower tube section is optimum for many blower applications. In alternative configurations, the fan axis is arranged with a predominantly vertical course, that is to say it then encloses a vertical angle of more than 45° with the horizontal backpack plane of the load-bearing frame.

In a refinement of the invention, the vertical angle is at most 10°. In this configuration, the fan axis and the backpack-side blower tube section thus run, in the use position of the blower on the back of a user, horizontally or at any rate largely horizontally, which proves to be optimum for many applications.

In a development of the invention, the backpack-side tube section has a curvature section made from a rigid tube material with a curvature angle of less than 90°. The selection of a rigid tube material for the curvature section of the backpack-side blower tube section contributes to satisfactory stability of the said tube section in the said curvature region which can form, for example, a transition to the hand-side tube section. The curvature angle which is smaller than 90° results in a tube bend and therefore a deflection of the blowing medium which is guided through it for the said curvature section, which deflection is smaller than a right-angled curvature, which can be favourable in the case of corresponding applications for the tube routing and the conducting of the blowing medium in the blower tube. The said curvature angle can advantageously be adapted if required to a certain oblique positioning of the fan axis with regard to the backpack transverse direction of the load-bearing frame, in such a way that the curvature section ends substantially parallel to the front-to-rear direction in the direction of the hand-side blower tube section. In alternative embodiments, the curvature section is formed from a pliable tube material and/or with a curvature angle of 90° or more.

In a refinement of the invention, the curvature angle lies specifically in the range between 60° and 85°. This represents an optimum curvature for the backpack-side blower tube section for certain blower applications.

In a development of the invention, the drive motor is an electric motor, and the energy source comprises a rechargeable battery pack which is held on the load-bearing frame. In this configuration, the blower forms an electric blower as a consequence. In alternative embodiments, the blower can comprise, for example, an internal combustion engine as drive motor and a petrol tank as energy source.

In a development of the invention, the drive motor has a motor axis which is parallel to the fan axis, and/or is arranged in the backpack-side tube section. This configuration provides a favourable precondition for a compact arrangement of the drive motor and the axial fan, for example as an integrated motor/fan structural unit in the backpack-side blower tube section. In alternative embodiments, the drive motor is arranged with a motor axis which is not parallel to the fan axis, and/or is arranged outside the backpack-side tube section of the blower tube.

In a refinement of the invention, the drive motor and the axial fan are arranged in a housing-forming region of the backpack-side tube section. This realises an integration, which is favourable for many applications, of the drive motor and the axial fan in a common housing which, in this case, at the same time acts as a part of the backpack-side blower tube section, by which the backpack-side blower tube section can be held on the load-bearing frame. In alternative embodiments, the drive motor and the axial fan are arranged in a common housing which is received in the interior of the backpack-side blower tube section.

In a development of the invention, the backpack-side tube section is connected by way of a sleeve-shaped holding part to the load-bearing frame. To this end, the sleeve-shaped holding part can engage around the backpack-side tube section, for example over the full circumference or, as an alternative, over a part of its circumference, preferably over more than half its circumference. In one advantageous realisation, the holding part engages around the backpack-side tube section in its housing-forming region which receives the drive motor and the axial fan. Depending on requirements, the holding part can be formed, for example, in one piece or in multiple pieces, for example in the form of two half shells, as a component which is fixed on the load-bearing frame or, as an alternative, as a single-piece component with the load-bearing frame.

In a development of the invention, the protective ring element is supported on the sleeve-shaped holding part and/or directly on the load-bearing frame. This can contribute to increased impact resistance, by it being possible for the protective ring element to dissipate impact forces which act to the holding part which is then of suitably impact-resistant configuration or directly to the load-bearing frame.

In a development of the invention, the protective ring element surrounds the axial blower tube end termination at a radial spacing, and/or projects axially by an axial overhang with respect to the axial blower tube end termination. In this case, the protective ring element can act as an impact protection means which is mounted such that it projects radially and axially for the blower tube end termination, with the result that the blower tube end termination can be kept completely free from impact forces which act.

In a refinement of the invention, an air guiding cone is positioned coaxially in front of an axial tube wall end region of the backpack-side tube section, an annular radial air inlet opening being formed. The air guiding cone forms a funnel-shaped axial outer boundary of an associated air inlet duct which opens radially as a result, and forms the blower tube end termination with an axially outer end. The backpack-side tube section of the blower tube can optionally be shaped correspondingly in a funnel-shaped or conical manner in its axial tube wall end region, or as an alternative can also end axially without a conical widened portion.

An air inlet grille which is made from an elastically deformable material is arranged on the said air inlet opening, the air inlet grille surrounding the axial tube wall end region of the backpack-side tube section at least on a part circumference side without contact at a radial spacing, and being connected firstly at an axially outer end axially in front of the axial tube wall end region of the backpack-side tube section to the protective ring element and secondly at an axially inner end axially behind the axial tube wall end region of the backpack-side tube section to the sleeve-shaped holding part and/or the load-bearing frame.

This realisation makes it possible for the air inlet grille to be used as an impact-absorbing element, by it being possible for it to yield in an elastically deforming manner to an impact action on the protective ring element which is of more rigid configuration, and to absorb and dissipate impact energy as a result. The axial tube wall end region of the backpack-side tube section can be held in a manner which is not influenced by any elastic deformation of the air inlet grille which acts in this way as an impact protection grille, since it has no mechanical contact with the latter. To this end, the radial spacing of the air inlet grille from the axial tube wall end region of the backpack-side tube section is expediently selected in such a way that it is at least as great as the spacing changes which are to be expected as a result of an elastic deformation of this type of the air inlet grille under an impact action. Overall, this refinement of the invention represents a very advantageous design with regard to air feed functionality and impact protection.

In a development of the invention, the protective ring element surrounds the axial blower tube end termination at least on the lower side. In this way, the protective ring element can act specifically as an impact protection means with respect to impact actions on the blower tube end termination from below, as can occur for example, when the blower is placed on the ground or if the blower accidentally falls onto the ground.

In a refinement of the invention, the protective ring element surrounds the axial blower tube end termination over the full circumference, that is to say in a substantially closed manner along its entire circumference, it being possible if required for comparatively small circumferential regions of a few circumferential angular degrees to remain free. This realises a correspondingly all-round protection of the said blower tube end termination, for example against impact actions from any desired radial directions.

In a development of the invention, the protective ring element comprises a ring holding section which is connected to the load-bearing frame, and a protective section which leads away in an angled manner from the ring holding section and surrounds the axial blower tube end termination over a circumferential angle of at least 180°. This is an advantageous design of the protective ring element with regard to structural attachment to the load-bearing frame and with regard to impact protection for the axial blower tube end termination and impact force dissipation.

Advantageous embodiments of the invention are shown in the drawings. These and further advantageous embodiments of the invention will be described in greater detail in the following text.

DETAILED DESCRIPTION OF THE DRAWINGS

Figure 1:
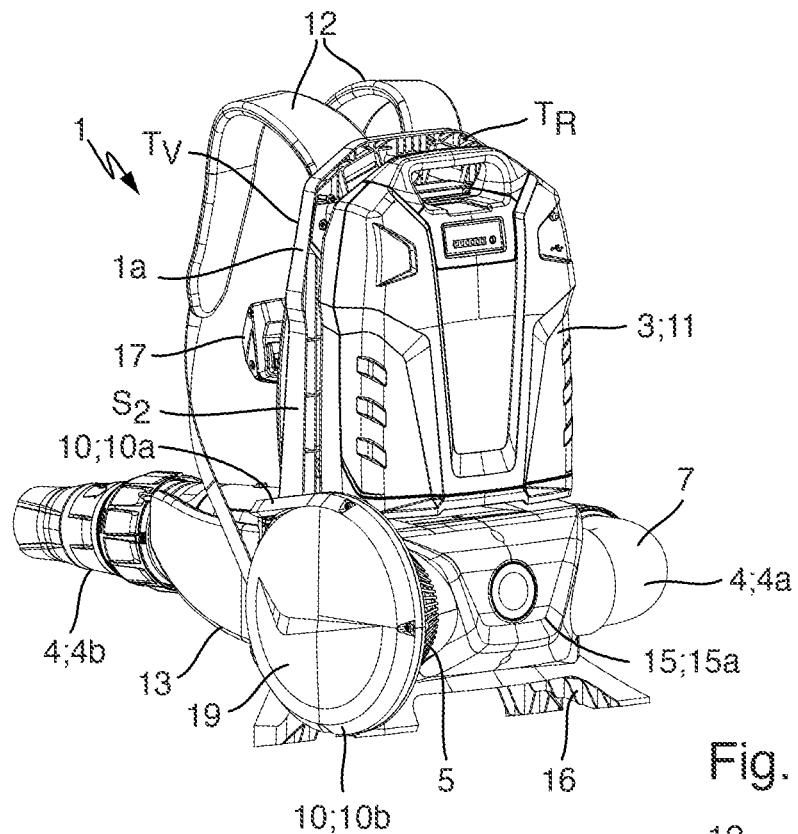
FIG. 1 shows a perspective view from the back left of a backpack electric blower.

As can be seen in the illustrated embodiment according to FIGS. 1 to 9, the backpack blower comprises a backpack 1, a blower tube 4, a drive motor 2, an energy source 3 for the drive motor 2, and an axial fan 6 which is driven by the drive motor 2. The backpack 1 has a load-bearing frame 1$a$, on the rear side of which a backpack-side tube section 4$a$ of the blower tube 4 is held. The backpack-side tube section 4$a$ terminates axially with an axial blower tube end termination 9, as can be seen, in particular, from the sectional illustration of FIG. 7.

Figure 2:
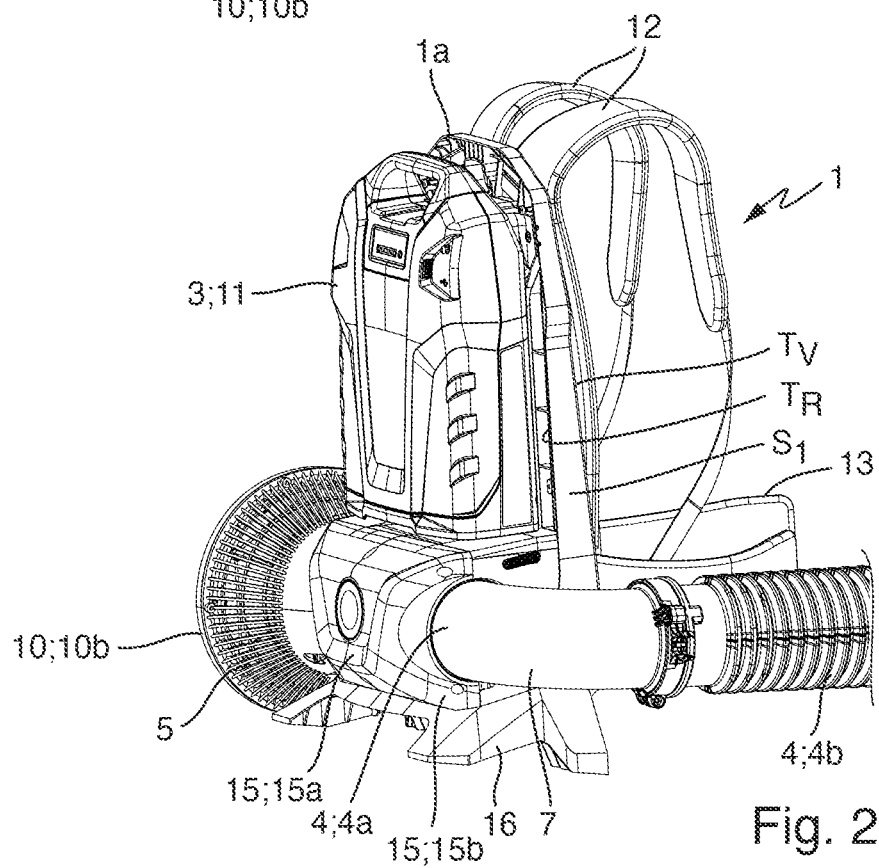
FIG. 2 shows a perspective view of the blower from the back right.
Figure 3:
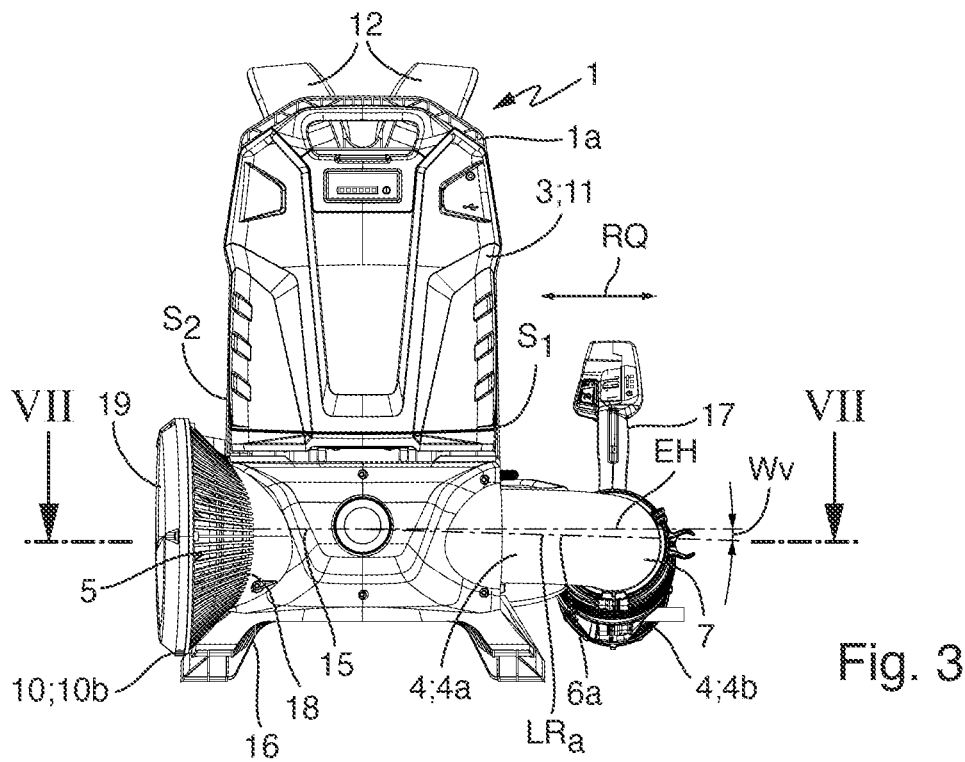
FIG. 3 shows a plan view from behind of the blower.
Figure 4:
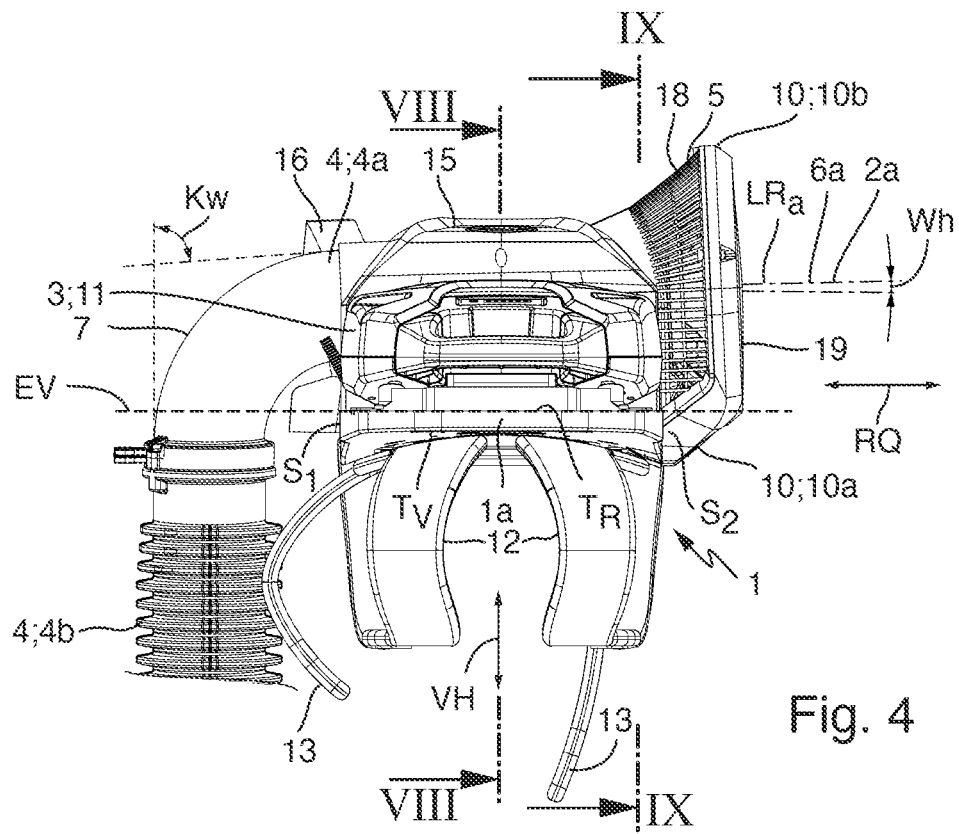
FIG. 4 shows a plan view from above of the blower.
Figure 5:
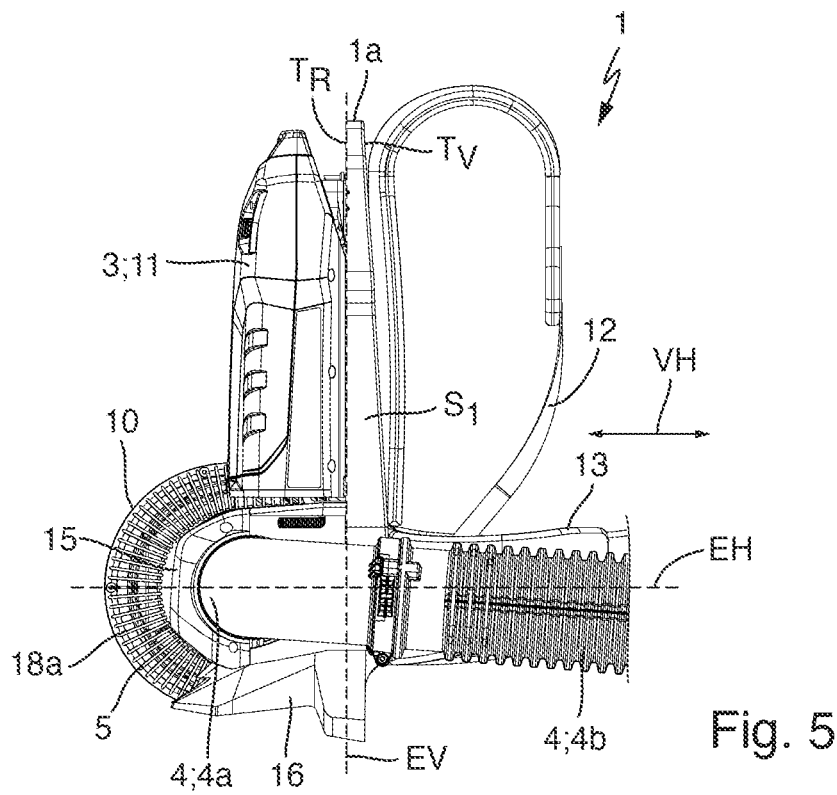
FIG. 5 shows a right-hand side view of the blower.
Figure 6:
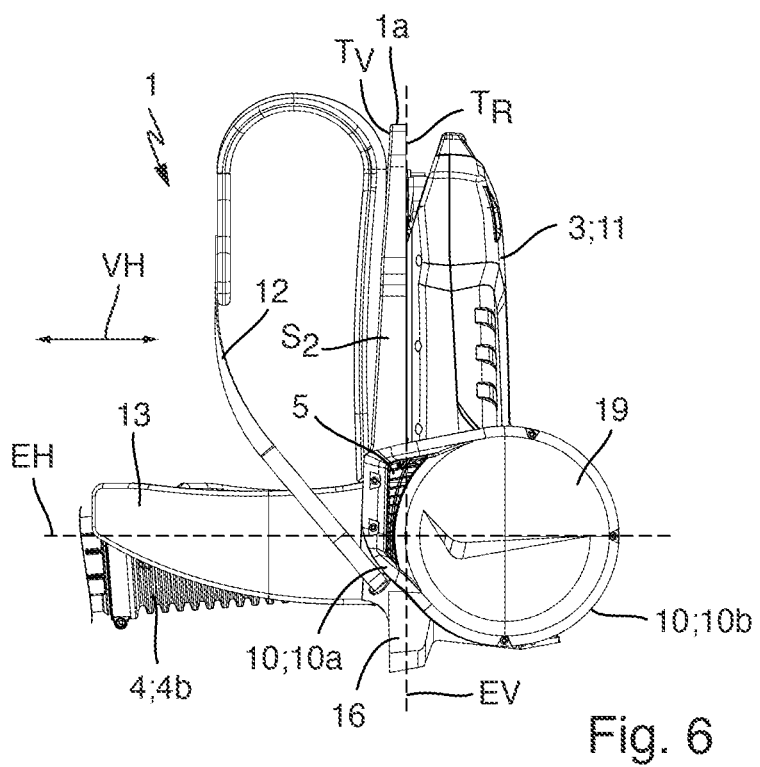
FIG. 6 shows a left-hand side view of the blower.

Furthermore, the blower tube 4 comprises a hand-side tube section 4$b$ which extends past the first side region $S_1$ of the load-bearing frame 1$a$, as can be seen, for example, from FIGS. 2 and 3. The axial fan 6 has an axial fan axis 6$a$, and is arranged in the backpack-side tube section 4$a$ of the blower tube 4. By means of the axial fan 6, blowing medium, preferably air, can be sucked in at the one end of the blower tube 4, can be conducted through the blower tube 4, and can be blown out at the other end of the blower tube.

In corresponding embodiments, the backpack-side tube section 4$a$ of the blower tube 4 runs, as in the example which is shown, with a main direction component in a backpack transverse direction RQ of the load-bearing frame 1$a$, that is to say a longitudinal axis $LR_a$ of the backpack-side tube section 4$a$ extends parallel to the backpack transverse direction RQ or, as in the example which is shown, obliquely with respect thereto with a greater direction component parallel to the backpack transverse direction RQ than in the direction which is perpendicular with respect to it.

Figure 7:
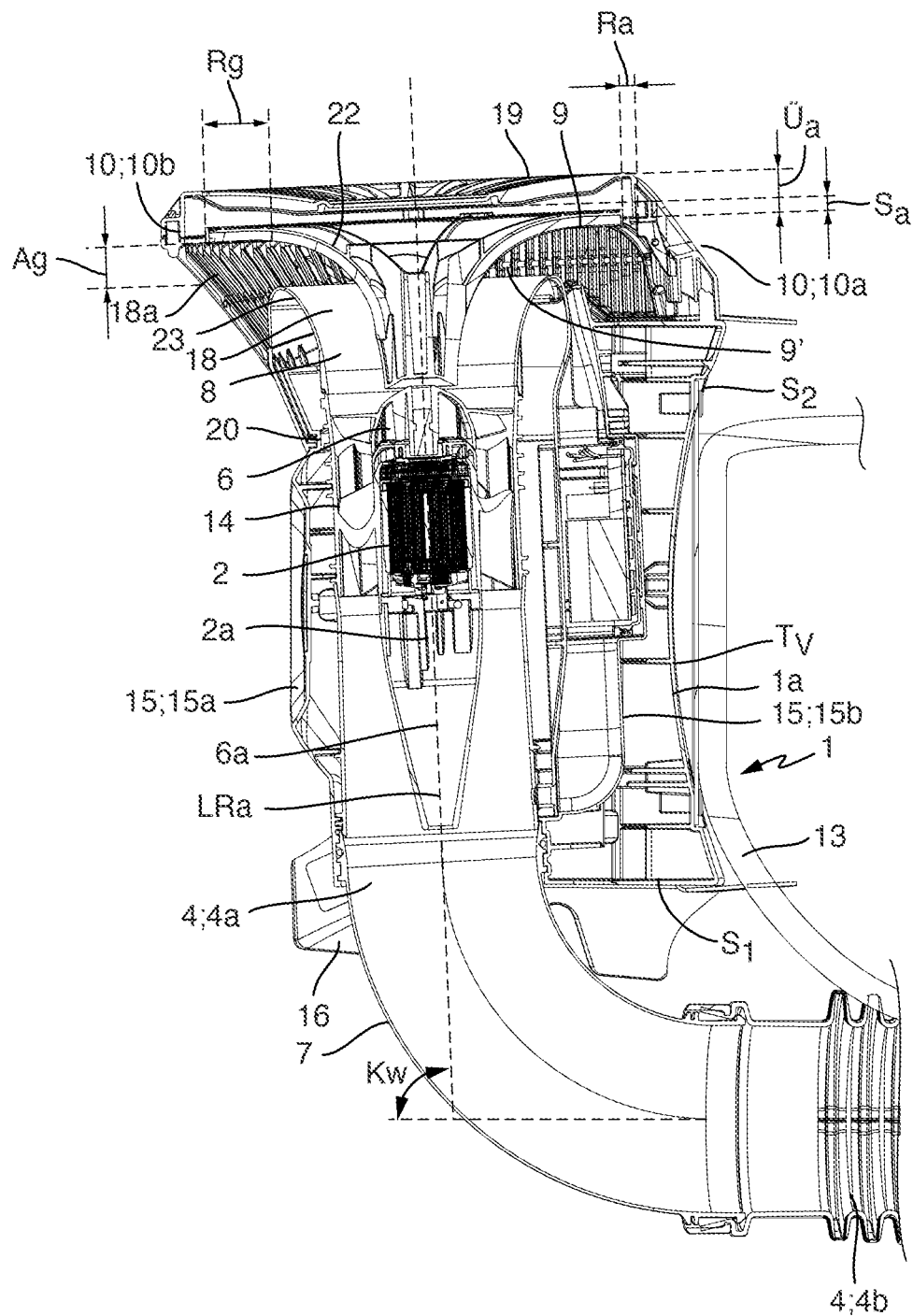
FIG. 7 shows a sectional view along a line VII-VII in FIG. 3.

In corresponding embodiments, the backpack-side tube section 4$a$ projects laterally with its axial blower tube end termination 9, as in the example which is shown, beyond a second side region $S_2$ of the load-bearing frame 1$a$, which second side region $S_2$ faces away from the first side region $S_1$, as can be seen from FIG. 7. In the example which is shown, the first side region $S_1$ of the load-bearing frame 1$a$ is a right-hand side region thereof, and the second side region $S_2$ is a left-hand side region; in alternative embodiments, this is reversed.

In corresponding embodiments, the axial blower tube end termination 9, as in the example which is shown, is surrounded at least on part of the circumferential side by a protective ring element 10 which is connected to the load-bearing frame 1$a$.

In the exemplary embodiment which is shown, the backpack blower is specifically an electric blower, that is to say the drive motor 2 is an electric motor, it being possible for it to be, for example, an electric leaf blower. In the latter case, the air inlet duct 18 acts as an intake duct. In this case, as in the examples shown, a rechargeable battery pack 11 which is held on the load-bearing frame 1$a$ acts as an energy source 3. Here, as in the example which is shown, the blower tube 4 is preferably positioned with its backpack-side tube section 4a in the vertical direction below the rechargeable battery pack 11.

In alternative embodiments, the blower can be of the vacuum type, instead of the blowing-out type as in the example which is shown, and/or can be equipped with an internal combustion engine as fan drive motor and a petrol tank or the like as associated energy source.

A user can carry the blower on his/her back, to which end the backpack 1 in the case of the exemplary embodiment which is shown has suitable carrying or shoulder straps which are fastened to the load-bearing frame 1a, for example two shoulder straps 12 and/or a waist strap unit 13 as shown. In the carrying state of the blower on the back of a user, the load-bearing frame 1a faces the back of the user with a front side $T_V$, and faces away from the said user with a rear side $T_R$. The backpack transverse direction RQ of the load-bearing frame 1a runs in a horizontal plane perpendicularly with respect to a front-to-rear direction VH which is defined by way of the spacing direction of the load-bearing frame front side $T_V$ and the load-bearing frame rear side $T_R$.

When the user has shouldered the blower, that is to say the backpack 1, and is carrying it on his/her back, he/she can grip and guide the hand-side blower tube section 4b with his/her corresponding hand on the same side, with his/her right hand in the case of the blower which is shown. As a gripping aid and in order to operate the blower, the hand-side tube section 4b of the blower tube 4 has an associated operating handle 17 which preferably projects upwards.

In corresponding realisations of the blower, the load-bearing frame 1a has, as in the case of the exemplary embodiment which is shown, a base region 16, by way of which the load-bearing frame 1a or the backpack 1 can be placed on the ground.

In corresponding embodiments, the fan axis 6a encloses, as in the example which is shown, a horizontal angle Wh (specified explicitly in FIG. 4) of between 1° and 30° with a vertical backpack transverse plane EV of the load-bearing frame 1a. In specific realisations, the said horizontal angle Wh lies in the range between 2° and 15° or, more specifically, between 2° and 3°. As an alternative, the said horizontal angle Wh lies above 30° or is less than 1°, for example in a realisation, in the case of which the fan axis 6a runs parallel to the backpack transverse direction RQ of the load-bearing frame 1a, which backpack transverse direction RQ for its part is parallel to the backpack transverse plane EV, and the said horizontal angle Wh is therefore 0°.

In corresponding embodiments, the fan axis 6a encloses, as in the example which is shown, a vertical angle Wv (specified explicitly in FIG. 3) of at most 45° with a horizontal backpack plane EH of the load-bearing frame 1a. In specific realisations, the said vertical angle Wv is at most 10°, it being, for example, 0° if, in an associated realisation, the fan axis 6a runs horizontally and therefore parallel to the horizontal backpack plane EH or to the backpack transverse direction RQ of the load-bearing frame 1a.

In advantageous embodiments, the backpack-side tube section 4a has, as in the case of the exemplary embodiment which is shown, a curvature section 7 made from a rigid tube material with a curvature angle Kw of less than 90°. In specific realisations, the said curvature angle Kw lies in the range between 60° and 85°. In the exemplary embodiment which is shown, the curvature angle Kw lies close to 90°.

In corresponding embodiments, the drive motor 2 has, as in the example which is shown, a motor axis 2a which is parallel to the fan axis 6a, as can be seen in the sectional view of FIG. 7. Specifically, in the example which is shown, the fan axis 6a and the motor axis 2a coincide with the longitudinal axis LRa of the backpack-side tube section 4a.

In corresponding embodiments, the drive motor 2 is, as in the example which is shown, arranged in the backpack-side tube section 4a. As an alternative, it can be arranged outside of the said backpack-side tube section 4a, for example on the load-bearing frame 1a. The positioning of the drive motor 2 and the axial fan 6 in the backpack-side tube section 4a in the case of the example which is shown can be seen specifically in the sectional view of FIG. 7.

In advantageous embodiments, the drive motor 2 and the axial fan 6 are, as in the case of the exemplary embodiment which is shown, arranged in a housing-forming region 14 of the backpack-side tube section 4a, by way of which housing-forming region 14 the backpack-side tube section 4a is at the same time held mechanically on the load-bearing frame 1a. To this end, a sleeve-shaped holding part 15 is provided which engages around the housing-forming region 14 of the backpack-side tube section 4a and is fixed on the load-bearing frame 1a. Here, the designation of housing-forming region means that it is that region of the backpack-side tube section 4a which receives the drive motor 2 and the axial fan 6 in a housing-like manner.

Figure 8:
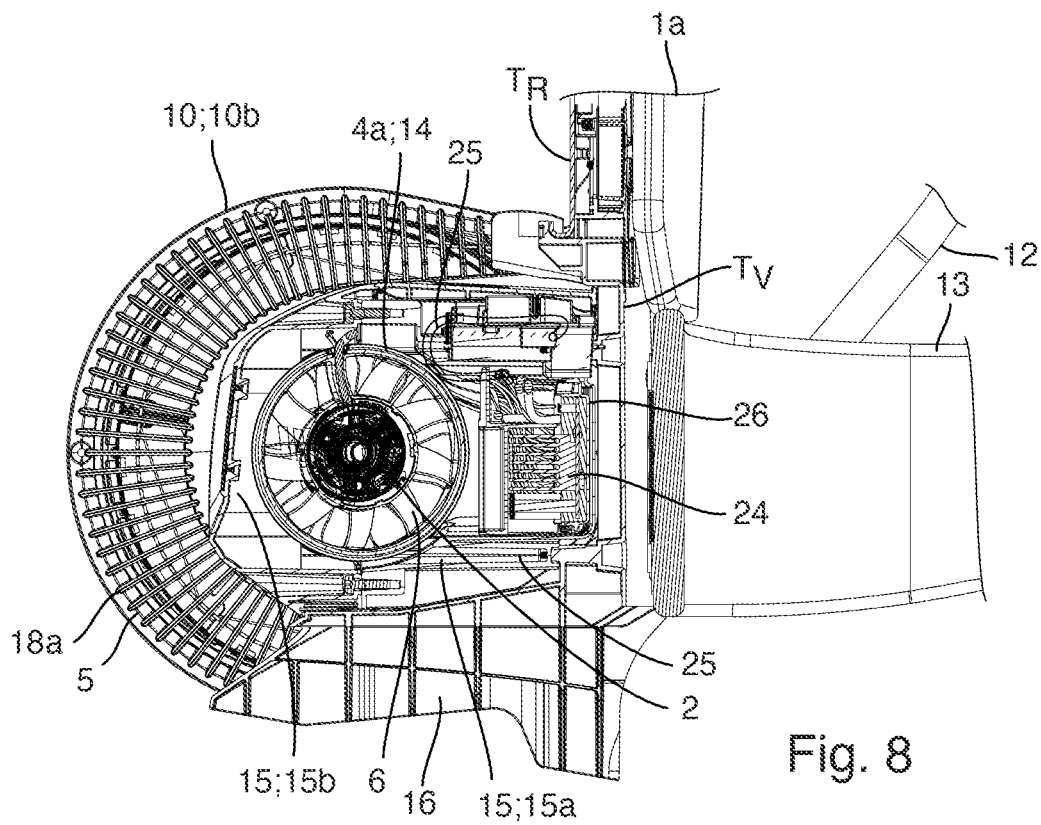
FIG. 8 shows a sectional view along a line VIII-VIII in FIG. 4.
Figure 9:
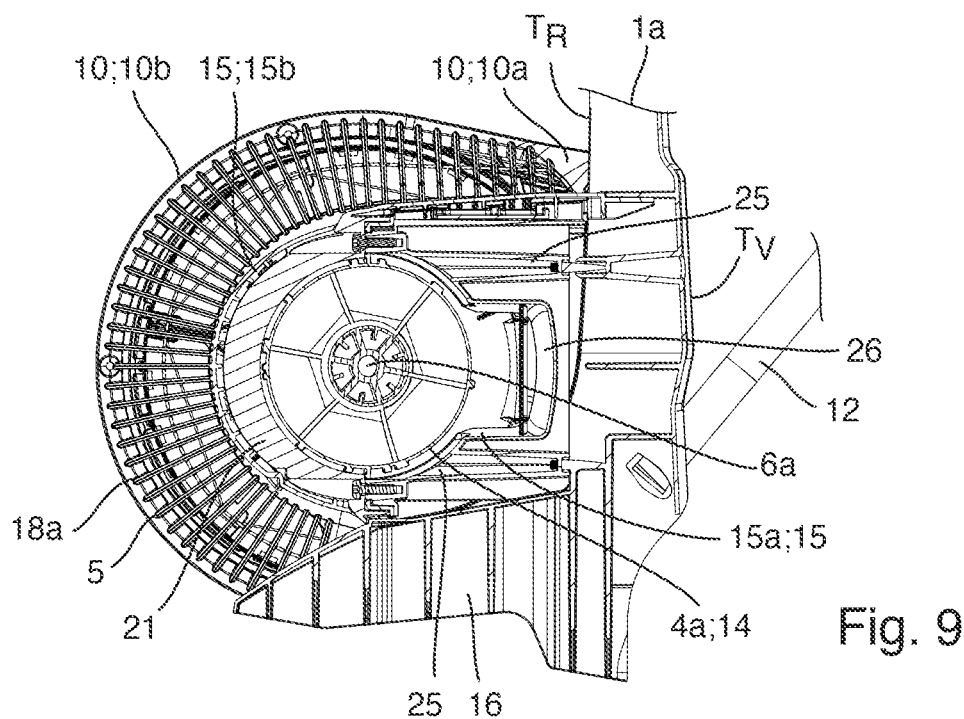
FIG. 9 shows a sectional view along a line IX-IX in FIG. 4.

In the example which is shown, the holding part 15 comprises, as can be seen, in particular, from FIGS. 8 and 9, a front half shell 15a which is fastened to the load-bearing frame 1a, for example via holding domes 25 and associated screw connections as shown, and a rear half shell 15b which is fixed, for example as shown, likewise by means of screw connections, on the front half shell 15a and in the process holds the housing-forming region 14 of the backpack-side tube section 4a in a manner which is clamped fixedly between the two half shells 15a, 15b. Fixing ribs 21, as can be seen in the sectional view of FIG. 9, ensure axial and tangential fixing of the housing-forming region 14 of the backpack-side tube section 4a on the sleeve-shaped holding part 15. In the example which is shown, the front half shell 15a has an indentation 26 which points towards the load-bearing frame 1a and in which, for example, an electric control 24 for the fan drive motor 2 can be accommodated in a protected manner. In alternative embodiments, the holding part 15 can be configured in one piece or can form an integral constituent part of the load-bearing frame 1a.

In alternative realisations, the drive motor 2 and the axial fan 6 are arranged without a common housing in the interior of the backpack-side tube section 4a which can then be held directly on the load-bearing frame 1a, for example by way of its tube wall.

The protective ring element 10 is preferably supported directly on the load-bearing frame 1a and/or on the sleeve-shaped holding part 15. To this end, the protective ring element 10 can be connected mechanically to the load-bearing frame 1a directly and/or via the holding part 15. As an alternative, the protective ring element 10 is supported additionally or exclusively via the backpack-side tube section 4a on the load-bearing frame 1a if the backpack-side tube section 4a is of sufficiently rigid configuration for this purpose.

In advantageous embodiments, the protective ring element 10 surrounds the axial blower tube end termination 9 radially on the outer side at a radial spacing Ra, and/or projects to the outside by an axial overhang Üa with respect to the axial blower tube end termination 9, both being realised in the example which is shown, as can be seen specifically in FIG. 7. As a result, the protective ring element 10 can protect the blower tube end termination 9 against impact actions in the radial and/or axial direction, without being mechanically in a supporting connection with it, by impacts in the radial and/or axial direction as a rule first of all acting on the protective ring element 10 which can absorb the impact forces and can forward them directly or indirectly to the load-bearing frame 1a, a sufficiently all-round yielding movement of the protective ring element 10 with respect to the blower tube end termination 9 being possible. Thus, for example, the radial spacing Ra is dimensioned in such a way that it is at least as great as the temporary radial spacing change to be expected at most of the protective ring element 10 with respect to the blower tube end termination 9 as a result of an impact action of this type.

In advantageous embodiments, the blower has, as in the exemplary embodiment which is shown, an air guiding cone 22 which is positioned coaxially in front of an axial tube wall end region 23 of the backpack-side blower tube section 4a with the formation of an annular radial air inlet opening 18a, and an air inlet grille 5 which is made from an elastically deformable material and is arranged on the air inlet opening 18a. The air guiding cone 22 terminates axially to the outside with a closure plate which, in this case, forms the axial blower tube end termination 9 and maintains an axial spacing Ag from the axial tube wall end region 23 of the backpack-side blower tube section 4a, which defines an effective air inlet cross section for the radial air inlet opening 18a. The air inlet grille 5 surrounds the axial tube wall end region 23 of the backpack-side blower tube section 4a at least on a part of its circumference without contact at a radial spacing Rg, and is connected firstly at an axially outer end to the protective ring element 10 and secondly at an axially inner end to the sleeve-shaped holding part 15, preferably axially behind the axial tube wall end region 23 of the backpack-side blower tube section 4a.

The air guiding cone 22 forms an air-tight funnel-shaped axial outer boundary of an associated air inlet duct 18 which opens radially by way of it, and is held on the motor/fan construction in the backpack-side tube section 4a. The axial tube wall end region 23 of the backpack-side tube section 4a of the blower tube can, as in the example which is shown, optionally be of correspondingly funnel-shaped or conical shape axially to the outside, and in this way can form an air inlet funnel 8. In this case, the air inlet duct 18 which leads to the fan 6 is delimited axially on both sides by a conical or funnel-shaped guiding surface in a manner which adjoins the annular radial air inlet opening 18a. In alternative realisations, the backpack-side tube section 4a ends without a conical widened portion on the axial tube wall end region 23.

The protective ring element 10 optionally has, as in the example which is shown, an axial termination cover 19 which acts as an axial termination of the protective ring element 10 or forms a constituent part of the latter. In this case, the protective ring element 10 is spaced apart with its termination cover 19 axially to the outside by a gap spacing Sa from the termination plate which in this case forms the blower tube end termination 9, as can be seen from FIG. 7. In this embodiment, the gap spacing Sa makes an axial yielding movement of the termination cover 19 of the protective ring element 10 with respect to the blower tube end termination 9 under the action of an impact possible, to which end it is dimensioned correspondingly in an analogous manner with respect to the abovementioned radial spacing Ra of the protective ring element 10.

In alternative design variants, the air guiding cone 22 is dispensed with, with the result that the axial blower tube end termination 9 is then formed by an axial front end 9' of the axial tube wall end region 23 of the backpack-side tube section 4a, as indicated in FIG. 7. In this case, the protective ring element 10 then maintains the said radial spacing Ra and, with its optional termination cover 19, maintains the said axial gap spacing Sa from the axial front end 9' of the axial tube wall end region 23 of the backpack-side tube section 4a.

The air inlet grille 5 forms a grille structure which lets the blowing medium through, in particular air, a radial intake or blowing-out characteristic for the blower tube 4 being provided at this end, which is closed axially to the outside by way of the air guiding cone 22. In the case of this configuration, air can therefore pass radially from the outside into the air inlet duct 18. The air inlet grille 5 can act as an impact-absorbing element, and can absorb impact forces which act on the protective ring element 10, for example in the case of a collision, in an elastically deforming manner, which prevents damage of the blower tube end termination 9 and/or the air inlet funnel 8. Here, the air inlet grille 5 can move within its radial spacing Rg relative to the axial tube wall end region 23 of the backpack-side tube section 4a, without making contact with the latter. The pliable air inlet grille 5 can therefore absorb impact forces which act, in particular, axially and/or radially from the outside on the more rigid protective ring element 10 in a deforming manner without impairment of the axial tube wall end region 23 and/or the air inlet funnel 8, and can dissipate them from the flexurally rigid protective ring element 10 to the flexurally rigid holding part 15 which for its part can dissipate them to the load-bearing frame 1a.

The air inlet grille 5 is preferably supported, as in the example which is shown, axially on the sleeve-shaped holding part 15 via a positively locking connection 20 which can be seen, for example, from FIG. 7. In addition, the air inlet grille 5 can be fixed radially on the sleeve-shaped holding part 15, for example by way of associated screw connections.

As can be seen more precisely from FIGS. 8 and 9, the air inlet grille 5 in the example which is shown is not of annularly closed configuration, but has a ring shape which is open in a lower region, in order to leave space there for the base region 16 of the load-bearing frame 1a which, to this extent, delimits the intake space or the air inlet opening 18a there and can additionally protect the axial blower tube end termination 9 against impacts. Depending on requirements, the air inlet grille 5 can be pre-manufactured in one piece or can be assembled from a plurality of individual grille parts.

In advantageous embodiments, the protective ring element 10 surrounds, as in the case of the example which is shown, the axial blower tube end termination 9 at least on the lower side. Therefore, the protective ring element 10 is capable of protecting the axial blower tube end termination 9 on the lower side against impact actions or strike actions and the like. As an alternative, it surrounds the axial blower tube end termination 9, for example, only in a rear-side section.

In advantageous embodiments, the protective ring element 10 surrounds, as in the example which is shown, the axial blower tube end termination 9 over the full circumference, that is to say along its entire circumference. In this way, the blower tube end termination 9 can be protected on all sides against impact effects or strike effects and the like.

In advantageous embodiments, the protective ring element 10 comprises, as in the case of the exemplary embodiment which is shown, a ring holding section 10a which is connected to the load-bearing frame 1a, and an annular protective section 10b which leads away in an angled manner from the ring holding section 10a and surrounds the axial blower tube end termination 9 over a circumferential angle of at least 180°. In the exemplary embodiment which is shown, the protective section 10b surrounds the blower tube end termination 9 over its entire circumferential angle of 360°. The air inlet grille 5 is supported on the protective section 10b and optionally, as in the example which is shown, also on the ring holding section 10a. Furthermore, in this case, the protective section 10b can act as a holder for the termination cover 19.

As the exemplary embodiments which are shown and the further above-described exemplary embodiments make clear, the invention very advantageously provides a backpack blower which can be configured as a blowing-out or, as an alternative, as a vacuum blower, is optimized with regard to its blowing medium conducting, and makes a compact arrangement of the blower tube on the load-bearing frame of the backpack, possibly together with a rechargeable battery pack as energy source for the fan drive motor, possible. The arrangement of the backpack-side tube section of the blower tube, which arrangement is predominantly horizontal and projects laterally beyond the load-bearing frame, facilitates a compact overall design with optimum air conducting. In addition or as an alternative, the blower tube end termination can be protected completely or partially on its circumference by way of the protective ring element against external mechanical actions. The possibility of it being possible for the blower tube to be arranged with its backpack-side tube section below the rechargeable battery pack additionally contributes to a compact construction of the blower.

What is claimed is:

1. A backpack blower, comprising:
   a backpack having a load-bearing frame;
   a blower tube having a backpack-side tube section which is held on a rear side of the load-bearing frame, and having a hand-side tube section which extends past a first side region of the load-bearing frame;
   a drive motor;
   an energy source for the drive motor; and
   an axial fan which is driven by the drive motor, has an axial fan axis, and is arranged in the backpack-side tube section of the blower tube, wherein
   the backpack-side tube section of the blower tube runs with a main direction component in a backpack transverse direction of the load-bearing frame and has an axial blower tube end termination,
   the axial blower tube end termination projects laterally beyond a second side region of the load-bearing frame, which second side region faces away from the first side region, or the axial blower tube end termination is surrounded at least on a part of its circumference by a protective ring element which is connected to the load-bearing frame, and
   the fan axis encloses a horizontal angle between 1° and 30° with a vertical backpack transverse plane of the load-bearing frame.

2. The backpack blower according to claim 1, wherein the fan axis encloses a horizontal angle between 2° and 15° with the vertical backpack transverse plane of the load-bearing frame.

3. The backpack blower according to claim 2, wherein the fan axis encloses a horizontal angle between 2° and 3° with the vertical backpack transverse plane of the load-bearing frame.

4. The backpack blower according to claim 1, wherein the fan axis encloses a vertical angle of at most 45° with a horizontal load-bearing plane of the load-bearing frame.

5. The backpack blower according to claim 4, wherein the fan axis encloses a vertical angle of at most 10° with the horizontal load-bearing plane of the load-bearing frame.

6. The backpack blower according to claim 1, wherein the backpack-side tube section has a curvature section made from a rigid tube material with a curvature angle of less than 90°.

7. The backpack blower according to claim 6, wherein the curvature section is made from the rigid tube material with a curvature angle between 60° and 85°.

8. The backpack blower according claim 1, wherein the drive motor is an electric motor, and the energy source comprises a rechargeable battery pack which is held on the load-bearing frame.

9. The backpack blower according to claim 1, wherein the drive motor has a motor axis which is parallel to the fan axis.

10. The backpack blower according to claim 1, wherein the drive motor has a motor axis which is arranged in the backpack-side tube section.

11. The backpack blower according to claim 10, wherein the drive motor and the axial fan are arranged in a housing-forming region of the backpack-side tube section.

12. The backpack blower according to claim 1, wherein the backpack-side tube section is connected by way of a sleeve-shaped holding part to the load-bearing frame.

13. The backpack blower according to claim 12, wherein the protective ring element is supported on the sleeve-shaped holding part.

14. The backpack blower according to claim 12, further comprising:
    an air guiding cone which is arranged coaxially in front of an axial tube wall end region of the backpack-side tube section with the formation of an annular radial air inlet opening, and forms the blower tube end termination with an axially outer end; and
    an air intake grille which is made from an elastically deformable material, is arranged on the air inlet opening, surrounds the axial tube wall end region of the backpack-side tube section at least on a part of its circumference without contact at a radial spacing, and is connected on the one hand at an axially outer end axially in front of the blower tube end termination to the protective ring element and on the other hand at an axially inner end axially behind the blower tube end termination to the sleeve-shaped holding part.

15. The backpack blower according to claim 1, wherein the protective ring element is supported directly on the load-bearing frame.

16. The backpack blower according to claim 1, wherein the protective ring element surrounds the axial blower tube end termination at least on its underside.

17. The backpack blower according to claim 16, wherein the protective ring element surrounds the axial blower tube end termination over its full circumference.

18. The backpack blower according to claim 1, wherein the backpack blower is an electric leaf blower.

19. A backpack blower, comprising:
    a backpack having a load-bearing frame;
    a blower tube having a backpack-side tube section which is held on a rear side of the load-bearing frame, and having a hand-side tube section which extends past a first side region of the load-bearing frame;
    a drive motor;
    an energy source for the drive motor; and an axial fan which is driven by the drive motor, has an axial fan axis, and is arranged in the backpack-side tube section of the blower tube, wherein the backpack-side tube section of the blower tube runs with a main direction component in a backpack transverse direction of the load-bearing frame and has an axial blower tube end termination, the axial blower tube end termination projects laterally beyond a second side region of the load-bearing frame, which second side region faces away from the first side region, or the axial blower tube end termination is surrounded at least on a part of its circumference by a protective ring element which is connected to the load-bearing frame, and the protective ring element surrounds the axial blower tube end termination at a radial spacing or projects with respect to the axial blower tube end termination by an axial overhang.

20. A backpack blower, comprising:

a backpack having a load-bearing frame;

a blower tube having a backpack-side tube section which is held on a rear side of the load-bearing frame, and having a hand-side tube section which extends past a first side region of the load-bearing frame;

a drive motor;

an energy source for the drive motor; and an axial fan which is driven by the drive motor, has an axial fan axis, and is arranged in the backpack-side tube section of the blower tube, wherein the backpack-side tube section of the blower tube runs with a main direction component in a backpack transverse direction of the load-bearing frame and has an axial blower tube end termination, and the axial blower tube end termination projects laterally beyond a second side region of the load-bearing frame, which second side region faces away from the first side region, or the axial blower tube end termination is surrounded at least on a part of its circumference by a protective ring element which is connected to the load-bearing frame;

an air guiding cone which is arranged coaxially in front of an axial tube wall end region of the backpack-side tube section with the formation of an annular radial air inlet opening, and forms the blower tube end termination with an axially outer end; and an air intake grille which is made from an elastically deformable material, is arranged on the air inlet opening, surrounds the axial tube wall end region of the backpack-side tube section at least on a part of its circumference without contact at a radial spacing, and is connected on the one hand at an axially outer end axially in front of the blower tube end termination to the protective ring element and on the other hand at an axially inner end axially behind the blower tube end termination to the load-bearing frame.

21. A backpack blower, comprising:

a backpack having a load-bearing frame;

a blower tube having a backpack-side tube section which is held on a rear side of the load-bearing frame, and having a hand-side tube section which extends past a first side region of the load-bearing frame;

a drive motor;

an energy source for the drive motor; and an axial fan which is driven by the drive motor, has an axial fan axis, and is arranged in the backpack-side tube section of the blower tube, wherein the backpack-side tube section of the blower tube runs with a main direction component in a backpack transverse direction of the load-bearing frame and has an axial blower tube end termination, the axial blower tube end termination projects laterally beyond a second side region of the load-bearing frame, which second side region faces away from the first side region, or the axial blower tube end termination is surrounded at least on a part of its circumference by a protective ring element which is connected to the load-bearing frame, and the protective ring element comprises a ring holding section which is connected to the load-bearing frame, and a protective section which leads away in an angular manner from the ring holding section and surrounds the axial blower tube end termination over a circumferential angle of at least 180°.

* * * * *